May 30, 1950 V. E. EDMONDS 2,509,970
COTTON PICKING MACHINE
Filed March 28, 1946 5 Sheets-Sheet 5
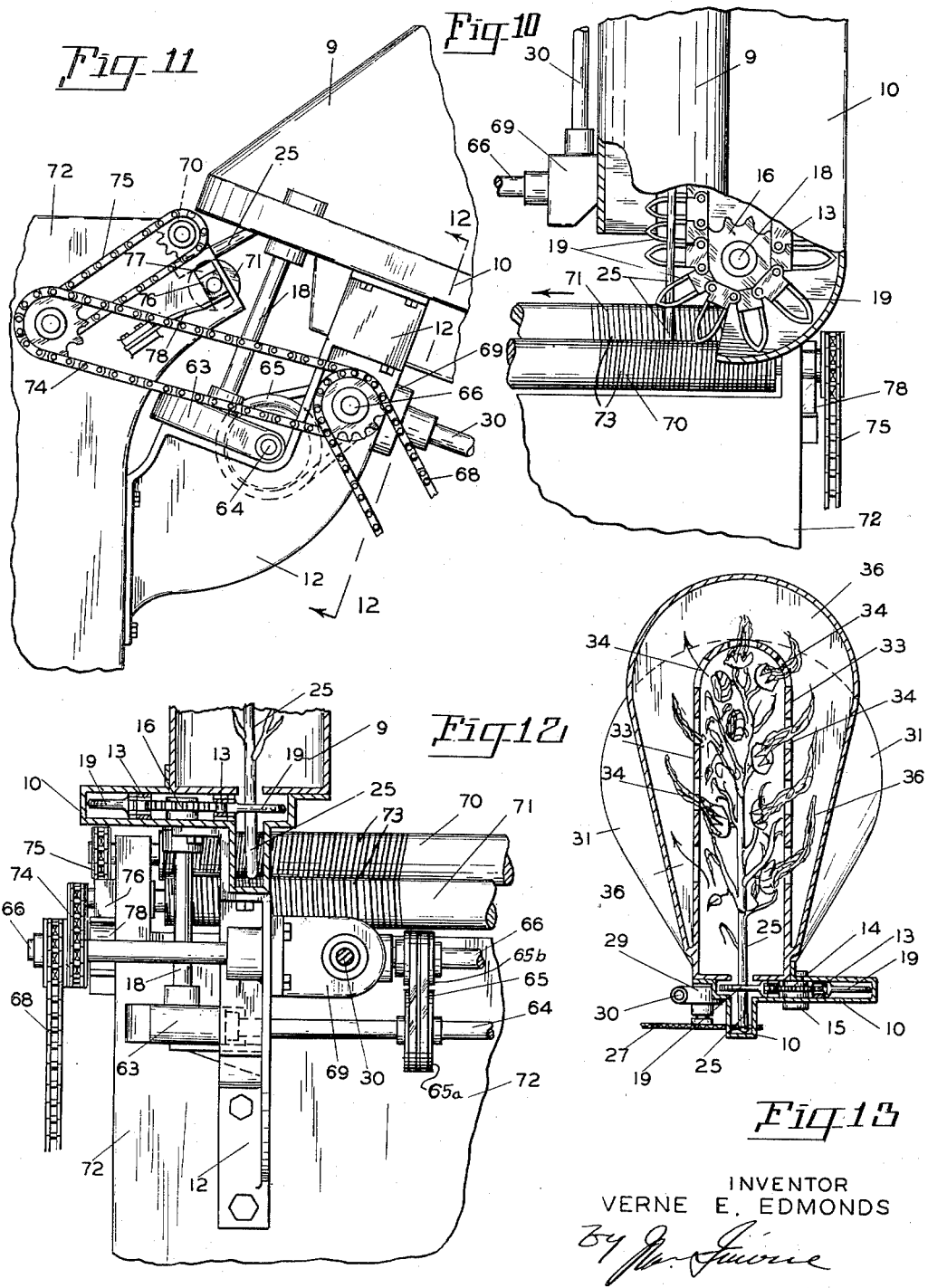
INVENTOR
VERNE E. EDMONDS
ATTORNEY Patented May 30, 1950

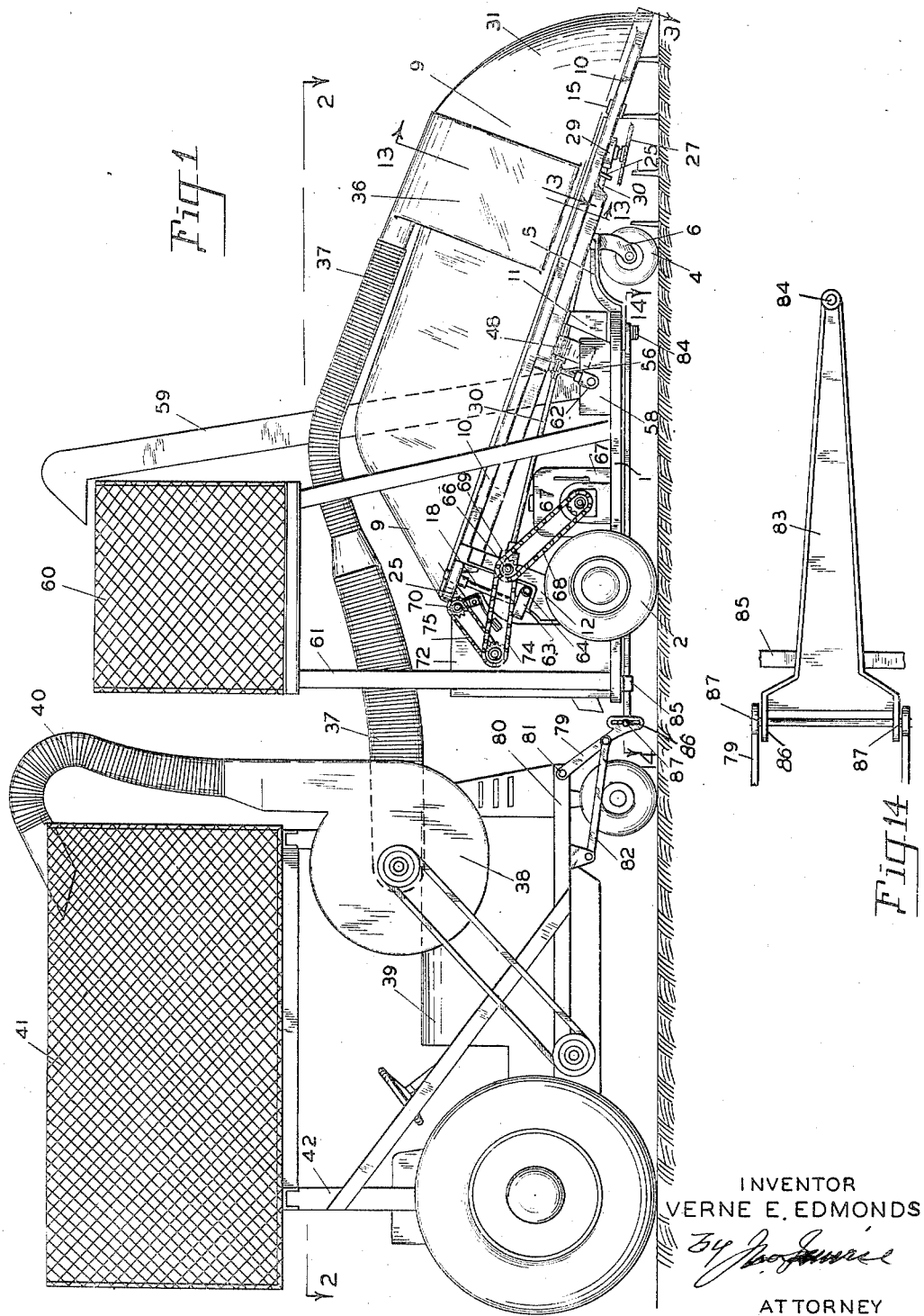

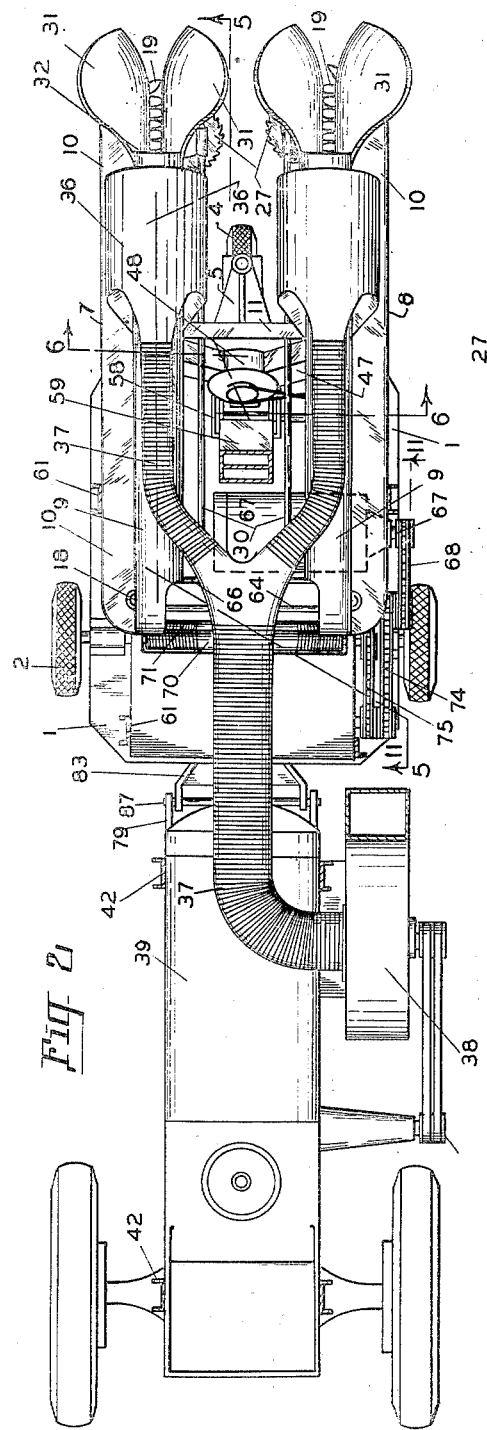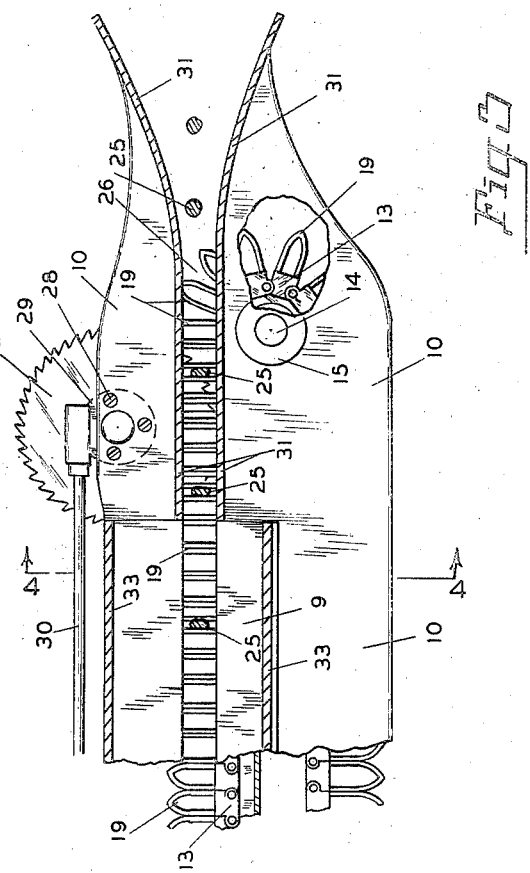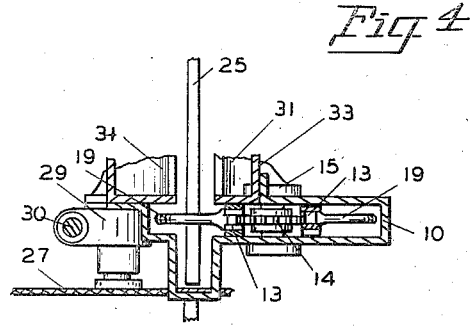
INVENTOR
VERNE E. EDMONDS
ATTORNEY

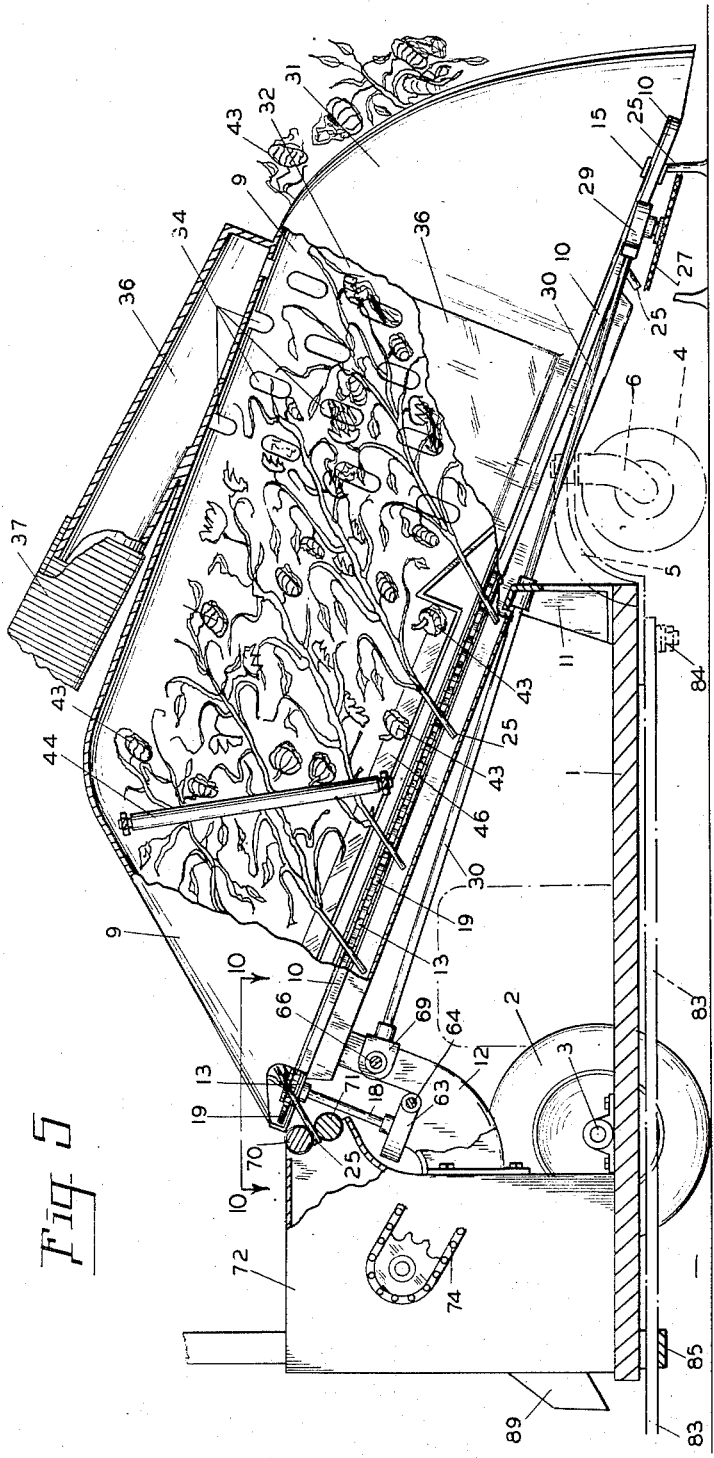

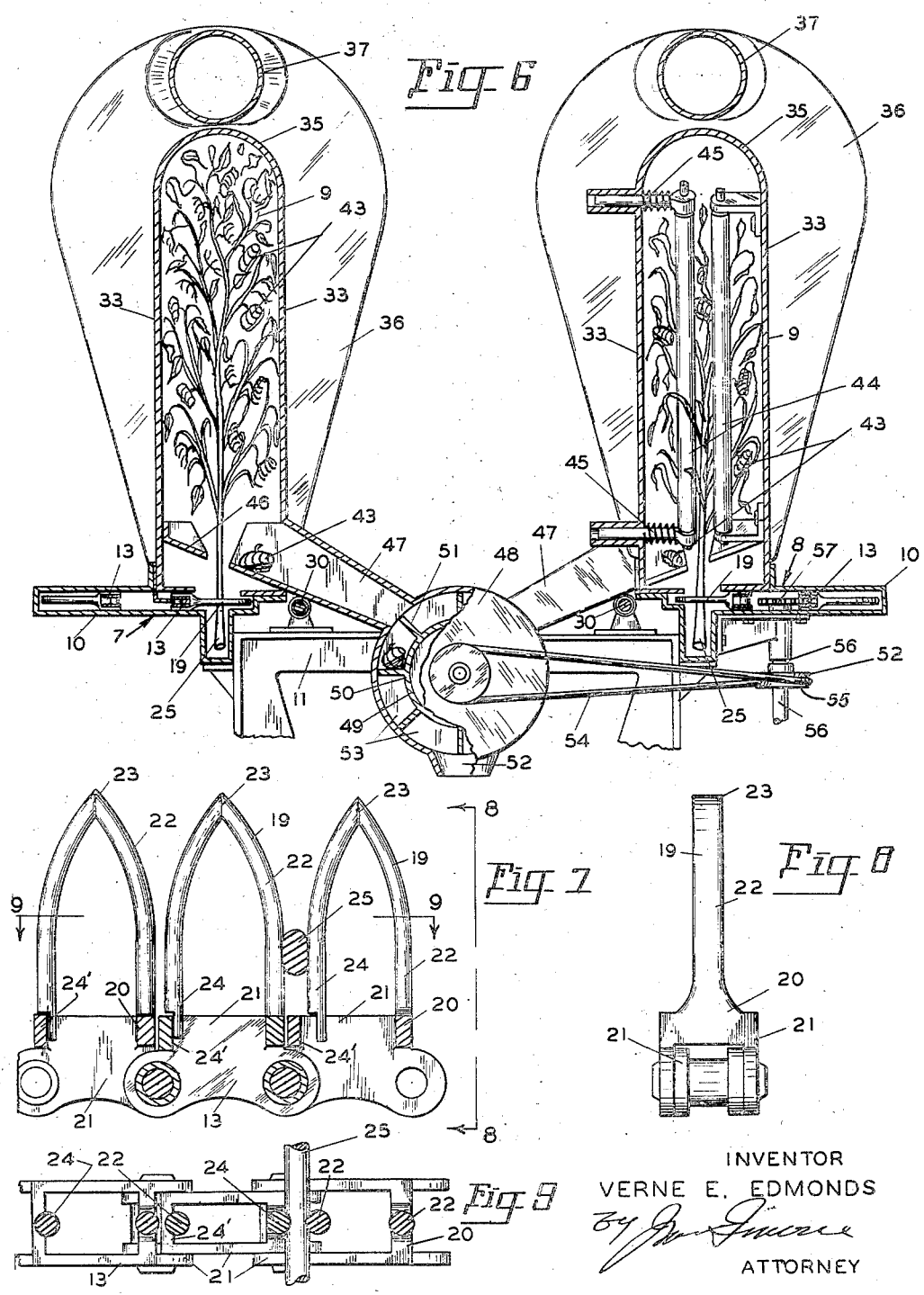

2,509,970

UNITED STATES PATENT OFFICE 2,509,970

COTTON-PICKING MACHINE

Verne E. Edmonds, Portland, Oreg.

Application March 28, 1946, Serial No. 657,839

7 Claims. (Cl. 56—30)

This invention relates to machines for picking cotton and the primary object of the invention is to employ a vacuum system for removing the cotton from the cotton plants.

In the carrying out of the object of my invention the plant is first cut from its root stock, then delivered into a vacuum chamber at which point the ripe cotton is removed from the cotton boll by a vacuum and delivered to a storage basket mounted upon the machine assembly. There will be some cotton bolls not sufficiently ripe to remove the cotton by a vacuum, but means is provided in the machine for removing these bolls from the plant delivering them into a separate basket mounted upon the machine. These bolls are removed and stored to ripen and later ginned.

Another feature of my invention is the provision of means for chopping up the cotton plants and distributing them over the ground surface as a fertilzer.

The machine is moved over the ground surface by a tractor, said tractor having the vacuum blower mounted thereon and driven by the power take off on the tractor. A power unit is mounted upon the machine which drives the necessary mechanical units associated with the machine.

These and other incidental objects will be apparent in the drawings, specifications and claims.

Referring to the drawings:

Figure 1 is a side elevation of my new and improved cotton picking machine associated with a standard wheeled tractor.

Figure 2 is a sectional view of the machine and tractor as illustrated on section line 2—2 in Figure 1.

Figure 3 is an enlarged fragmentary view of the cotton plant cutter and the plant conveyor, the same being taken on line 3—3 of Figure 1.

Figure 4 is an end sectional view taken on line 4—4 of Figure 3.

Figure 5 is an enlarged side view taken on line 5—5 of Figure 2, parts broken away for convenience of illustration.

Figure 6 is an enlarged fragmentary sectional view taken on line 6—6 of Figure 2, the same being taken through the vacuum chambers.

Figure 7 is a fragmentary enlarged detail sectional view of the conveyor chain.

Figure 8 is an end sectional view of the chain.

Figure 9 is a sectional view taken on line 9—9 of Figure 7.

Figure 10 is a fragmentary plan view of the discharge end of the conveyor and its relation to the plant cutter unit, parts broken away for convenience of illustration.

Figure 11 is a fragmentary side view of the discharge end of the conveyor and the plant cutter, the same being taken on section line 11—11 of Figure 2.

Figure 12 is a fragmentary end sectional view through the discharge end conveyor, looking into the plant cutter, the same being taken on line 12—12 of Figure 11.

Figure 13 is a sectional end view taken through the vacuum chamber, illustrating the picking of the cotton from the plant by a vacuum.

Figure 14 is a plan view of the push bar for guiding the cotton picking machine over the ground surface, illustrating how the connection is made to the push bars mounted to the tractor and taken on line 14—14 of Figure 1.

In the drawings:

My new and improved cotton picker consists of a platform or base 1, mounted upon wheels 2, journalled to the axles 3, which are fixedly secured to the platform 1 at its one end, and being supported by the trunnion wheel 4 at its opposite end through the bracket 5 and the pivotally mounted fork 6. Mounted upon the platform are conveyor units 7 and 8, upon which in turn is mounted vacuum chambers 9.

The conveyor units consist of the longitudinal box-like frames 10, which are supported upon the platform 1 by the brackets 11 and 12. Conveyor chains 13 are trained about idler sprockets 14, journalled within suitable bearings 15 at the lower or front ends of the conveyor frames 10. The opposite ends of the conveyor chains 13 are trained about driving sprockets 16, journalled to the frames 10 within suitable bearings 17. The sprockets 16 are fixedly secured to the driving shaft 18, the operation of which will be later described.

The conveyor chains 13 are of special construction, consisting of resilient fingers 19 fixedly secured at 20 to the links 21 (referring to Figures 7, 8 and 9). These fingers consist of spring material 22, round in cross section extending upwardly from an anchorage 20 doubling back at 23, terminating in the free end 24 which normally bears against the cross member or stop 24' of the links 21.

Referring to Figure 3, the cotton plant stalk is indicated at 25 and as the machine travels forward in the direction of the arrow the stalk 25 enters the space 26 between the fingers 19 and as the chain straightens out on its straight run the stalk 25 is compressed between the members 22 and 24 of the fingers of the chain and is securely held therebetween. The member 24 being resilient in nature firmly pinches the stock between itself and the member 22, and due to the round cross section of the finger units, the stock can be tilted at an angle to the right angle of the conveyor as best illustrated in Figure 5. After the fingers 19 of the conveyor have gripped the cotton stalk it is desirable to cut the stock as best illustrated in Figures 1 and 5. This is accomplished by a rotary saw 27, which is mounted to the lower end of the conveyor framework 10 at 28. The saw is journalled to a gear box 29, whose gears are driven by the shaft 30, which will be more fully described later.

As the machine travels over the ground surface the cotton plants enter between the gathering boards 31 and into the conveyor chains as above described. The plants enter the open end 32 of the vacuum chambers 9. The purpose of the gathering boards 31 is to compress the plants into the relatively narrow vacuum chambers 9, to feed the plants and the cotton bolls between the side walls 33 of the chambers. Openings 34 are located in these side walls and around the top 35 of the chambers 9 communicating with the manifolds 36. A vacuum is drawn in the manifold 36 by way of the tubing 37 and vacuum fan 38, which is preferably mounted to the tractor 39. As the conveyor chains 13 pull the cotton plants 25 through the vacuum chambers 9 the vacuum within the manifold 36 pulls the cotton through the openings 34, as best shown and illustrated in Figure 13, into the manifold and piping 37 to the vacuum blower 38 and out through the tubing 40 into a suitable rack 41, which may be mounted upon the tractor by suitable framework 42.

There will be some cotton bolls 43 that will not have ripened sufficiently for the vacuum to remove them from the cotton plant. As the conveyor chain moves the plants through the chambers 9 the plants will be pulled between the rollers 44, best shown in Figures 5 and 6. These rollers are maintained in close proximity to one another but are allowed flexibility by a suitable spring mounting assembly 45. As the plant is pulled between the rollers the bolls 43 are prevented from going therebetween and are pulled away from the plant. These bolls fall on the inclined boards 46 and are directed into the chutes 47, the boards 46 being spaced to provide a narrow slot that is sufficient for the passage of the plant stalks 25 but will not permit the bolls 43 to drop therethrough. The chutes 47 terminate in a housing 48 having a rotor 49 rotatably mounted therein.

The rotor consists of a drum 50 working between the end walls of the housing 48 and having partitions or blades 51 fixedly secured thereto. As this rotor is revolved the bolls roll into position against the drum 50 and between the blades or partitions 51 and are carried around to the discharge spout 52. The partitions bridge the space 53 maintaining a vacuum seal so that vacuum will be maintained within the chamber 9. The rotor 49 is driven by a belt 54, which in turn is driven by the pulley 55 mounted to a shaft 56, the shaft having a sprocket 57 keyed thereto operated by the conveyor chain 13.

The spout 52 delivers the bolls 43 into the elevator hopper 58. The elevator 59, which may comprise an endless conveyor of any suitable type, is adapted to receive the bolls from the hopper 58 and hoist the bolls into the rack 60, mounted upon suitable supports 61 to the platform 1. The shaft 56 extends into the gear box 62 which is connected to the lower sprocket for the endless conveyor of the elevator 59 and operates the conveyor, not here shown, within the elevator.

The conveyor chains 13 are driven by the driving sprocket 16 and the drive shaft 18, the drive shaft 18 is driven by a suitable gear reduction 63, which in turn is operated by the cross shaft 64. The speed of the shaft 18 is relatively low due to the gear reduction 63 and the speed is further reduced by a pulley 65a on the shaft 64, belt 65 and pulley 65b on the cross shaft 66, which, in turn, is driven directly from the power plant 67 by the chain 68. The saw 27 is driven by the shaft 30 through the gear box 69, which in turn is operated by the cross shaft 66. The speed of the shaft 30 is relatively high due to the requirement of the rotary saw 27 having to be driven at a high rate of speed.

The conveyor chain 13, referring to Figures 10 and 11, delivers the stalk 25 of the cotton plant into the feed rollers 70 and 71 of the machine 72 for chopping up the cotton plant so that it can be spread over the ground surface in fine particles suitable for fertilizing the ground. I have not shown the inner structure of the chopping machine as any well known chopping structure such as that employed in the usual field choppers wherein forage is chopped and delivered to a loading conveyor. In the present instance, the chopped plant material is merely fed out onto the ground instead of to a loading conveyor. The rollers 70 and 71 have spirally cut grooves 73 around their circumferences which are operative to move the stalk in the direction of the arrow immediately it is gripped by the rollers 70 and 71, and at which time it is being released by the fingers 19 of the conveyors 13. This sidewise movement allows the chain conveyor 13 to continue to run without striking the plant, and at the same time the plant is removed from the chambers 9.

A suitable drive chain 74 drives the chopping unit 72. A driving chain 75 drives the feed roller 70. The roller 71 is mounted in sliding bearing blocks 76. These blocks work within guideways 77, as shown in Fig. 11, the roller 71 beinng forced towards the roller 70 by a suitable spring 78, which forces the bearing blocks 76 towards the roller 70 within their guides 77.

I will now describe the method of connecting my cotton picking machine to a standard wheel tractor. Push bars 79 are mounted to the tractor frame 80 and 81 and have suitable braces 82 holding them in the position, shown in Figure 1. One of these bars is mounted on each side of the tractor. Underneath the platform 1 is a push bar 83 pivotally mounted at 84 to the platform at its forward end, the rear of this bar is supported by a cross bar 85 secured to the underneath side of the platform but allowing the push bar 83 to pivot about its point 84. The rear end 86 of the push bar is pivotally mounted within the vertical slots 87 of the tractor push bar 79. This method of connecting the cotton picking machine to the tractor provides a rigid lateral connection between the tractor and the pivot point 84 of the push bar 83 so that as the tractor is guided the outer end of the push bar 83 will guide the platform 1 upon its caster wheel 4, thereby steering the cotton picking machine in front of the tractor.

I will now describe the operation of my new and improved cotton picking machine. As the tractor pushes the machine along the rows of cotton plants the gathering boards 31 will straddle the rows of plants directing them into the fingers 19 of the conveyor chains 13. When these fingers start on the straightaway of the chain travel they will grip the stalks 25 of the plant and at the same time this is done the saw 27 will cut the stalk best illustrated on Figures 1 and 5. The conveyor 13 carries the plants through the vacuum chambers 9, past the openings 34, at which time the cotton that is ripe is removed from the plant by the vacuum created in the manifold 36, through the piping 37 from the vacuum fan 38 from where it will be delivered to the rack 41 through the blower pipe 40.

On the travel of the plant through the vacuum chamber 9 it will pass between the rollers 44 pulling the unripened cotton bolls from the plant, due to the fact that the boll will not pass between the rollers. These bolls will fall on the inclined surface 46 and be delivered by the chutes 47 on to the rotor 49 between the blades or partitions 51, which in turn delivers them to the chute 52 into the elevator hopper 58 and up the elevator 59 into the rack 60. When the plant reaches the point 88, best shown in Figures 5, 10 and 11 it will be released by the fingers 19 of the conveyor simultaneously with entering between the rollers 70 and 71 of the chopping unit 72, at which time it will be withdrawn from the vacuum chamber 9 and run through the chopping unit 72 and delivered to the ground surface by way of the chute 89.

I do not wish to be limited to the exact structure as shown, as other mechanical equivalents may be substituted still coming within the scope of my claims.

I claim:

1. A cotton picking machine, including a frame, means on said frame for resiliently gripping the cotton stalks, means operatively associated with said gripping means for delivering the stalks to the gripping means, means on said frame for advancing the gripping means in stalk-gripping relation lengthwise of the frame, vacuum means on said frame for removing the cotton from the ripened bolls of the stalks in the advancing gripping means, and means on said frame for separating the unripened bolls from the stalks during the advance of the stalks in the gripping means.

2. A cotton picking machine as defined in claim 1, wherein the gripping means includes an endless link chain, a first arm connected to and extending from each link, a second arm terminally connected to the outer end of the first arm and extending to a free connection with the link to be resiliently tensioned by a stalk gripped between the said second arm and the first arm of the adjacent link.

3. A cotton picking machine as defined in claim 1, wherein said vacuum means includes a chamber open to the cotton in the bolls of the stalks in the gripping means, and means for creating a vacuum in said chamber to separate the cotton from said bolls.

4. A cotton picking machine as defined in claim 1, wherein said vacuum means includes a chamber and a box-like frame having side walls to embrace and confine the stalks in the gripping means, the walls of the box-like frame being in open communication with the vacuum chamber.

5. A cotton picking machine as defined in claim 1, wherein the means for separating the unripened bolls from the stalks carried by the gripping means includes spaced rollers between which the stalks carried by the gripping means are directed, said rollers being spaced to permit passage of the stalks but prevent passage of the bolls to thereby separate such unripened bolls from the stalks, and means for receiving and collecting said separated bolls.

6. A cotton picking machine as defined in claim 1, including cooperating rollers for receiving and withdrawing the stalks from the gripping means at the inner end of their movement, and means on said frame for receiving said stalks from said rollers and chopping and discharging the stalks to the ground for use as a fertilizer.

7. A cotton picking machine as defined in claim 1, wherein said vacuum means includes a chamber open to the cotton in the bolls of the stalks in the gripping means, and said means for separating the unripened bolls from the stalks includes yieldingly mounted rollers arranged vertically of the vacuum chamber and spaced apart to permit passage of the stalks but prevent the unripened bolls from passing between them and thereby snap the unripened bolls from the stalks, an inclined chute at the lower end of the vacuum chamber to receive the separated unripened bolls, and a substantially vacuum-tight rotary conveyor to deliver the bolls beyond the influence of the vacuum.

VERNE E. EDMONDS.

REFERENCES CITED

The following references are of record in the file of this patent:

UNITED STATES PATENTS

| Number | Name | Date |
|---|---|---|
| 459,621 | Baker | Sept. 15, 1891 |
| 459,623 | Baker | Sept. 15, 1891 |
| 1,423,472 | Taylor | July 18, 1922 |
| 1,722,747 | Hentz | July 30, 1929 |
| 1,879,823 | Ray | Sept. 27, 1932 |